(12) United States Patent
Chen

(10) Patent No.: US 11,475,693 B2
(45) Date of Patent: Oct. 18, 2022

(54) DISPLAY MODULE AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Bi Chen, Wuhan (CN)

( * ) Notice: Subject to any disclaimer, the term of this patent is extended or adjusted under 35 U.S.C. 154(b) by 237 days.

(21) Appl. No.: 17/053,774

(22) PCT Filed: Jun. 30, 2020

(86) PCT No.: PCT/CN2020/099348
§ 371 (c)(1),
(2) Date: Nov. 8, 2020

(87) PCT Pub. No.: WO2021/253491
PCT Pub. Date: Dec. 23, 2021

(65) Prior Publication Data
US 2022/0189198 A1    Jun. 16, 2022

(30) Foreign Application Priority Data

Jun. 17, 2020  (CN) .......................... 202010553976.7

(51) Int. Cl.
*G06V 40/13* (2022.01)
*G06F 3/044* (2006.01)

(52) U.S. Cl.
CPC ........ *G06V 40/1306* (2022.01); *G06F 3/0443* (2019.05); *G06F 3/0446* (2019.05); *G06F 3/0448* (2019.05); *G06F 2203/04111* (2013.01)

(58) Field of Classification Search
CPC . G06F 3/044–0448; G06F 2203/04111; G06V 40/1306
See application file for complete search history.

(56) References Cited

U.S. PATENT DOCUMENTS

| | | | |
|---|---|---|---|
| 9,823,801 B2* | 11/2017 | Chan | G06F 3/047 |
| 10,681,830 B1 | 6/2020 | Goodenough | |
| 10,712,889 B2* | 7/2020 | Park | G06F 3/0443 |
| 10,860,155 B2* | 12/2020 | Ye | G06F 3/0448 |
| 10,871,866 B2* | 12/2020 | Kang | G06F 3/0446 |
| 10,955,981 B2* | 3/2021 | Gong | G06F 3/0443 |
| 11,023,058 B2* | 6/2021 | Park | G06F 3/0412 |
| 11,301,073 B2* | 4/2022 | Kim | H01L 27/323 |

(Continued)

FOREIGN PATENT DOCUMENTS

CN          109933240 A       6/2019

*Primary Examiner* — Patrick F Marinelli

(57) ABSTRACT

The present invention discloses a display module and a display device. The display module includes a display panel and a fingerprint identification layer. The fingerprint identification layer includes a first conductive layer including a multifunctional electrode, a second conductive layer including a first driving electrode, a sensing electrode, and a second driving electrode. The first driving electrode and the second driving electrode are both electrically connected to the multifunctional electrode. The sensing electrode is insulated from the multifunctional electrode. Orthographic projections of the sensing electrode and the multifunctional electrode on the display panel have an overlapping region.

20 Claims, 4 Drawing Sheets

(56) References Cited

U.S. PATENT DOCUMENTS

| | | | |
|---|---|---|---|
| 2012/0081300 A1* | 4/2012 | Chan | G06F 3/0446 |
| | | | 345/173 |
| 2015/0346866 A1* | 12/2015 | Kusunoki | H01L 27/323 |
| | | | 345/174 |
| 2016/0370900 A1* | 12/2016 | Chan | G06F 3/0445 |
| 2019/0189699 A1* | 6/2019 | Ye | G06F 3/044 |
| 2020/0026377 A1* | 1/2020 | Gwon | G06F 3/0443 |
| 2020/0301546 A1* | 9/2020 | Ye | G06F 3/0445 |
| 2021/0026483 A1* | 1/2021 | Miyamoto | G09G 3/3225 |
| 2021/0120324 A1* | 4/2021 | Seo | H01L 27/3234 |
| 2021/0200974 A1* | 7/2021 | Hong | H04N 1/442 |

* cited by examiner

DISPLAY MODULE AND DISPLAY DEVICE

FIELD OF INVENTION

The present invention is related to the field of display technology, and specifically, to a display module and a display device.

BACKGROUND OF INVENTION

With development of display technology, display devices such as smartphones and tablet computers have become indispensable tools in daily life. They usually store a large amount of personal information and important data, and their security is highly valued by users. Among them, fingerprint identification technology can ensure information security of these terminal devices and make them extremely convenient for users to use. In a vast majority of current display devices, fingerprint identification modules are usually placed as separate modules in non-display regions, such as a front lower frame, a side surface, or a back surface. The fingerprint identification modules of the above schemes affect a screen-to-body ratio and an internal space of a whole device.

In order to maximize the screen-to-body ratio, integrating the fingerprint identification module into a display region of a panel has become a mainstream development direction. Meanwhile, with a rise of flexible foldable screens, after screen covers adopt flexible foldable ultra-thin materials, a difficulty of integrating a capacitive screen fingerprint identification module in the display region of the panel is reduced. In normal conditions, the smaller a size of the fingerprint identification electrode, the smaller a working capacitance and the worse a penetration ability. An increase in the size of a fingerprint identification electrode can improve the penetration ability. However, the increase in the size leads to a decrease in a resolution of fingerprint identification, and its identification accuracy also decreases. In order to better integrate the fingerprint identification module into the panel, it is urgent to develop a new fingerprint identification electrode design solution to obtain higher fingerprint identification accuracy and penetration capability.

SUMMARY OF INVENTION

The present application provides a display module and a display device. A fingerprint identification layer in the display module is designed with a special structure to effectively improve penetration capability of fingerprint identification under a premise that accuracy of fingerprint identification remains unchanged.

In order to solve the above problems, in one aspect, the present invention provides a display module, including:

a display panel; and a fingerprint identification layer disposed on the display panel and including a first insulating layer, a first conductive layer, a second insulating layer, a second conductive layer, and a third insulating layer, which are sequentially stacked;

wherein the fingerprint identification layer is divided into a plurality of fingerprint identification units arranged in an array and connected to each other; in any one of the fingerprint identification units, the first conductive layer includes a multifunctional electrode, and the second conductive layer includes a first driving electrode, a sensing electrode, and a second driving electrode, which are spaced apart from each other; in two adjacent fingerprint identification units, the multifunctional electrodes of the two fingerprint identification units are spaced apart, the sensing electrode of one of the fingerprint identification units is electrically connected to the sensing electrode of the other, or the first driving electrode of one of the fingerprint identification units is electrically connected to the second driving electrode of the other, or the first driving electrode or the second driving electrode of one of the fingerprint identification units is electrically connected to the sensing electrode of the other; and wherein the first driving electrode and the second driving electrode are both electrically connected to the multifunctional electrode to realize conduction, the sensing electrode is insulated from the multifunctional electrode, and an orthographic projection of the sensing electrode on the display panel and an orthographic projection of the multifunctional electrode on the display panel have an overlapping region.

In the display module provided by an embodiment of the present invention, an area of the overlapping region of the orthographic projection of the sensing electrode on the display panel and the orthographic projection of the multifunctional electrode on the display panel accounts for 10 to 50% of an area of the sensing electrode.

In the display module provided by an embodiment of the present invention, the second insulating layer is provided with a first through hole and a second through hole, and the first driving electrode and the second driving electrode are electrically connected to the multifunctional electrode through the first through hole and the second through hole, respectively.

In the display module provided by an embodiment of the present invention, materials of the first conductive layer and the second conductive layer are independently selected from one or more of gold, silver, copper, lithium, sodium, potassium, magnesium, aluminum, zinc, indium-tin-oxide, aluminum-doped zinc-oxide, antimony-doped tin-oxide, carbon nanotubes, and nano silver.

In the display module provided by an embodiment of the present invention, the first conductive layer and the second conductive layer are stacked layers of indium-tin-oxide/silver/indium-tin-oxide layers.

In the display module provided by an embodiment of the present invention, a thickness of the indium-tin-oxide layer ranges from 5 to 50 nanometers, and a thickness of the silver layer ranges from 5 to 30 nanometers.

In the display module provided by an embodiment of the present invention, materials of the first insulating layer, the second insulating layer, and the third insulating layer are independently organic insulating materials or inorganic insulating materials.

In the display module provided by an embodiment of the present invention, in a top view, the sensing electrode is an hourglass shape, and the first driving electrode and the second driving electrode are respectively disposed in recessed portions on two sides of the hourglass shape.

In the display module provided by an embodiment of the present invention, shapes of the first driving electrode and the second driving electrode are isosceles trapezoidal or triangular.

In the display module provided by an embodiment of the present invention, the multifunctional electrode includes a first strip portion and a second strip portion arranged crosswise, the first driving electrode and the second driving electrode are both electrically connected to the first strip portion, and an orthographic projection of the second strip portion on the display panel is located in the orthographic projection of the sensing electrode on the display panel.

In the display module provided by an embodiment of the present invention, the first strip portion and the second strip portion are formed by a one-time film forming and patterning process.

In the display module provided by an embodiment of the present invention, the first strip portion and the second strip portion are formed by a two-time film forming and patterning process.

In the display module provided by an embodiment of the present invention, the first strip portion is formed above the second strip portion, or the first strip portion is formed under the second strip portion.

In the display module provided by an embodiment of the present invention, material of the first strip portion is selected from opaque metal conductive materials, and material of the second strip portion is selected from transparent conductive materials.

In the display module provided by an embodiment of the present invention, the material of the first strip portion is titanium aluminum alloy, and the material of the second strip portion is indium-tin-oxide or a combination of indium-tin-oxide and silver.

In the display module provided by an embodiment of the present invention, in the fingerprint identification layer, four fingerprint identification units arranged in two rows by two columns constitute a smallest repeating unit; in two fingerprint identification units of a pair of opposite corners, conduction directions of the first driving electrode and the second driving electrode are both a first direction; and in two fingerprint identification units of another pair of opposite corners, conduction directions of the first driving electrode and the second driving electrode are both a second direction, and the first direction and the second direction are perpendicular to each other.

In the display module provided by an embodiment of the present invention, a first adhesive layer, a polarizer, a second adhesive layer, and a cover plate are further provided on the fingerprint identification layer.

In another aspect, the present invention provides a display device, including the display module describe above.

Compared with the prior art, the present invention provides the display module and the display device. In the display module, the fingerprint identification layer is directly disposed in the display region on the display panel to realize an integration of the fingerprint identification module. The fingerprint identification layer includes fingerprint sensing electrodes and fingerprint driving electrodes, which are arranged conventionally, and bridge wires for electrically conducting a plurality of fingerprint driving electrodes. Also, an extended portion of the driving electrode is added to the bridge wires. The insulating layer is disposed between the extended portion of the driving electrode and the sensing electrode, which generates a capacitor. The capacitor is connected in parallel with a capacitor between the fingerprint sensing electrode and the fingerprint driving electrode, which can effectively increase an overall capacitance sensing amount of the fingerprint identification electrode. That is, under a premise that a size of the fingerprint identification electrode remains unchanged, the capacitance sensing amount of fingerprint identification can be increased. Therefore, under a premise that accuracy of fingerprint identification remains unchanged, a penetration ability of fingerprint identification is improved; or in the fingerprint recognition electrode with a smaller size and higher accuracy, the capacitance sensing amount can still be maintained high to simultaneously improve products' fingerprint identification accuracy and penetration ability.

DESCRIPTION OF DRAWINGS

In order to describe technical solutions in the present invention clearly, drawings to be used in the description of embodiments will be described briefly below. Obviously, drawings described below are only for some embodiments of the present invention, and other drawings can be obtained by those skilled in the art based on these drawings without creative efforts.

DETAILED DESCRIPTION OF PREFERRED EMBODIMENTS

The technical solution of the present invention embodiment will be clarified and completely described with reference accompanying drawings in embodiments of the present invention embodiment. Obviously, the present invention described parts of embodiments instead of all of the embodiments. Based on the embodiments of the present invention, other embodiments which can be obtained by a skilled in the art without creative efforts fall into the protected scope of the of the present invention.

In the description of the present invention, it should be explained that the terms "center", "portrait", "transverse", "length", "width", "thickness", "upper", "lower", "front", "back", "left", "right", "vertical", "horizontal", "top", "bottom", "inside", "outside", etc. are based on the drawings. The orientation or positional relationship is only for the convenience of describing the present invention and simplifying the description, and does not indicate or imply that the device or element referred to must have a specific orientation, structure and operation in a specific orientation, and should not be viewed as limitations of the present invention. In addition, terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present invention, the meaning of "multiple" is two or more, unless specifically defined otherwise.

The word "exemplary" is used herein to mean "serving as an example, instance, or illustration." Any embodiment or design described herein as "exemplary" is not necessarily to be construed as preferred or advantageous over other embodiments or designs. The following descriptions are presented to enable any person skilled in the art to make and use the invention. Descriptions of specific embodiments and inventions are provided only as examples. Various modifications and combinations of the examples described herein will be readily apparent to those skilled in the art, and the general principles defined herein may be applied to other examples and inventions without departing from the spirit and scope of the invention. Thus, the present invention is not intended to be limited to the examples described and shown, but is to be accorded the widest scope consistent with the principles and features disclosed herein.

An embodiment of the present invention provides a display module, which will be described in detail below.

Figure 1:
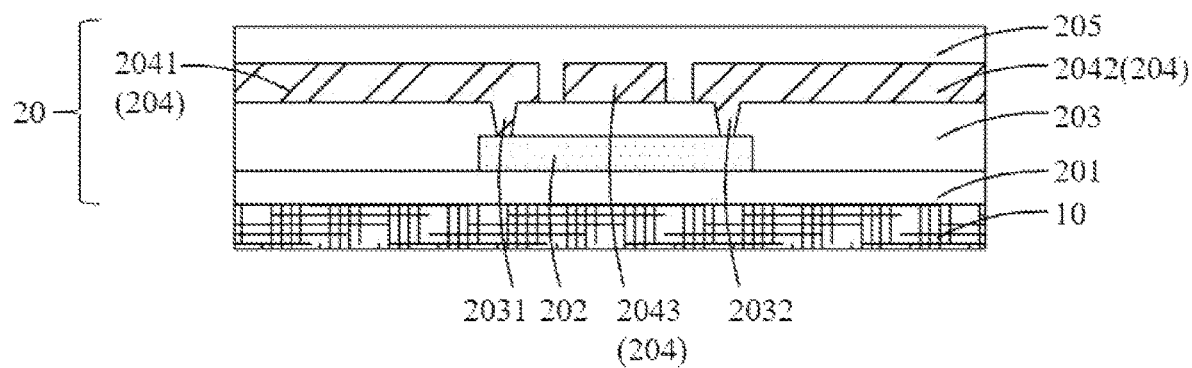
FIG. 1 is a schematic diagram of a cross-sectional structure of a display module provided by an embodiment of the present invention.
Figure 2:
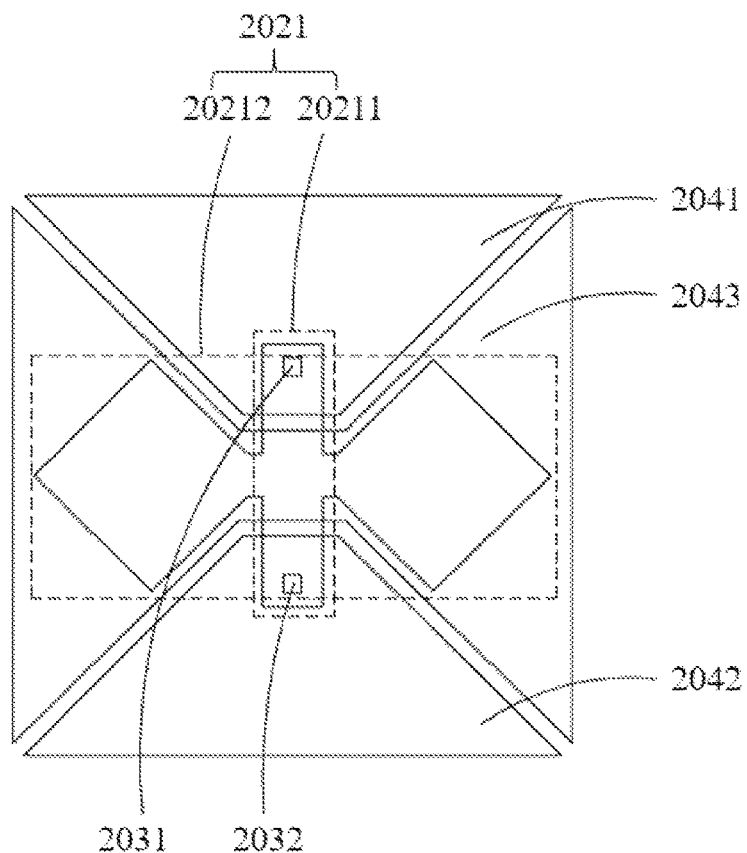
FIG. 2 is a schematic diagram of a structure of a fingerprint identification unit in a fingerprint identification layer of the display module provided by an embodiment of the present invention.
Figure 3:
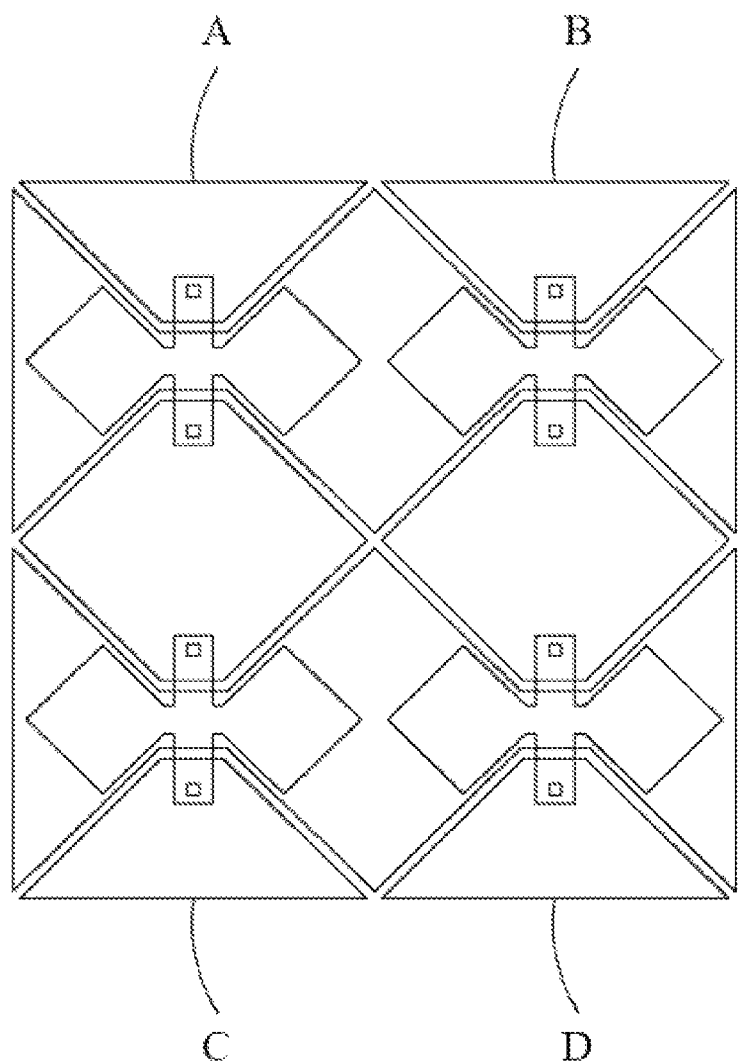
FIG. 3 is a schematic diagram of an arrangement of the fingerprint identification units in the fingerprint identification layer of the display module provided by an embodiment of the present invention.

FIG. 1 is a schematic diagram of a cross-sectional structure of the display module provided by an embodiment of the present invention. FIG. 2 is a schematic diagram of a structure of a fingerprint identification unit in a fingerprint identification layer of the display module provided by an embodiment of the present invention. FIG. 3 is a schematic diagram of an arrangement of the fingerprint identification units in the fingerprint identification layer of the display module provided by an embodiment of the present invention.

Specifically, the display module includes:

a display panel 10; and a fingerprint identification layer 20 disposed on the display panel 10 and including a first insulating layer 201, a first conductive layer 202, a second insulating layer 203, a second conductive layer 204, and a third insulating layer 205, which are sequentially stacked.

In a top view, the fingerprint identification layer 20 is divided into a plurality of fingerprint identification units arranged in an array and connected to each other. In any one of the fingerprint identification units, which is shown in FIG. 2, the first conductive layer includes a multifunctional electrode 2021, and the second conductive layer includes a first driving electrode 2041, a sensing electrode 2043, and a second driving electrode 2042, which are spaced apart from each other.

The plurality of fingerprint identification units are connected in sequence to form a whole fingerprint identification layer, which is shown FIG. 3 (the drawing only shows four fingerprint identification units). In any two adjacent fingerprint identification units, the multifunctional electrodes of the two fingerprint identification units are spaced apart. The multifunctional electrodes in the fingerprint identification units A/B/C/D are independently spaced apart. In two adjacent fingerprint identification units, the sensing electrode and the driving electrode have a connection relationship. Specifically, the sensing electrode of one of the fingerprint identification units is electrically connected to the sensing electrode of the other, for example, the sensing electrode of the fingerprint identification unit A is electrically connected to the sensing electrode of fingerprint identification unit B to form a whole body. Or, the first driving electrode of one of the fingerprint identification units is electrically connected to the second driving electrode of the other, for example, the first driving electrode of the fingerprint identification unit A is electrically connected to the second driving electrode of the fingerprint identification unit C to form a whole body. Or, the first driving electrode or the second driving electrode of one of the fingerprint identification units is electrically connected to the sensing electrode of the other (this connection formation is not shown in FIG. 3, refer to embodiments described later for details).

The first driving electrode 2041 and the second driving electrode 2042 are both electrically connected to the multifunctional electrode 2021 to realize conduction. The second insulating layer 203 (not shown) is disposed between the sensing electrode 2043 and the multifunctional electrode 2021 to realize insulation. Also, an orthographic projection of the sensing electrode 2043 on the display panel and an orthographic projection of the multifunctional electrode 2021 on the display panel have an overlapping region.

In structural designs of the fingerprint identification units provided above, the third insulating layer 205 is disposed between the driving electrodes (including the first driving electrode 2041 and the second driving electrode 2042) and the sensing electrode 2043 to realize insulation and forms a capacitor, which is defined as $C_f$. The multifunctional electrode is designed with a special shape, which realizes a conventional bridge function for electrically conducting the first driving electrode 2041 and the second driving electrode 2042, and the orthographic projection of the sensing electrode 2043 on the display panel and the orthographic projection of the multifunctional electrode 2021 on the display panel have the overlapping region. Thus, a capacitor is also formed between the sensing electrode 2043 and the multifunctional electrode 2021, which is defined as $C_d$. $C_f$ and $C_d$ are parallel to each other, so an overall capacitance of the fingerprint identification units is a sum of $C_f$ and $C_d$. Compared with a traditional fingerprint identification structural design, which only has one capacitor $C_f$, under a premise of not expanding the area of the fingerprint recognition unit (i.e., the accuracy of fingerprint identification remains unchanged), the present solution increases an overall capacitance sensing amount, which effectively improves a penetration ability of fingerprint identification.

In some embodiments, different display modules have different requirements for touch performance, so an area of the overlapping region of the orthographic projection of the sensing electrode 2043 on the display panel 10 and the orthographic projection of the multifunctional electrode 2021 on the display panel 10 accounts for 10 to 50% of an area of the sensing electrode. Different projection areas of the overlapping region are realized by designing a shape of the multifunctional electrode 2021. The area of the overlapping region should not be too small, otherwise an increase in the overall capacitance sensing amount is too small, which is meaningless. In another aspect, the area of the overlapping region should not be too large, otherwise other functions of the fingerprint identification layer is affected.

In some embodiments, the second insulating layer 203 is provided with a first through hole 2031 and a second through hole 2032. The first driving electrode 2041 and the second driving electrode 2042 are electrically connected to the multifunctional electrode 2021 through the first through hole 2031 and the second through hole 2032, respectively.

In some embodiments, materials of the first conductive layer 202 and the second conductive layer 204 are independently selected from one or more of gold, silver, copper, lithium, sodium, potassium, magnesium, aluminum, zinc, indium-tin-oxide, aluminum-doped zinc-oxide, antimony-doped tin-oxide, carbon nanotubes, and nano silver, for example, they can be stacked layers of indium-tin-oxide/silver/indium-tin-oxide layers. Furthermore, in order to better improve relevant performances of the fingerprint identification, material of the first conductive 202 is made of metal material to obtain a better conductivity. The second conductive layer 204 occupies a relatively large area, and in a bid to avoid affecting transmittance of the display panel, its material can be a transparent conductive material with a high transmittance.

In some embodiments, materials of the first insulating layer 201, the second insulating layer 203, and the third insulating layer 205 are independently organic insulating materials or inorganic insulating materials, which are selected according to actual process requirements and are not limited in the present invention.

Please refer to FIG. 2. In some embodiments, in the top view, the sensing electrode 2043 is an hourglass shape. The first driving electrode 2041 and the second driving electrode 2042 are respectively disposed in recessed portions on two sides of the hourglass shape. Specifically, in order to facilitate an arrangement, the sensing electrode 2043 is the hourglass shape formed by connecting two isosceles trapezoids to corresponding two sides of a rectangle. The first driving electrode 2041 and the second driving electrode 2042 are respectively adaptively arranged in the corresponding recessed portions on two sides of the hourglass shape, so that their shapes are isosceles trapezoidal or triangular (not shown).

Besides, the multifunctional electrode 2021 includes a first strip portion 20211 and a second strip portion 20212 arranged crosswise. The first driving electrode 2041 and the second driving electrode 2042 are both electrically connected to the first strip portion 20211. An orthographic projection of the second strip portion 20212 on the display panel is located in the orthographic projection of the sensing electrode 2043 on the display panel. The second strip portion 20212 is equivalent to an extended portion of the driving electrode, and forms a capacitor with the sensing electrode 2043, so that the overall capacitance sensing amount is increased.

Furthermore, the first strip portion 20211 and the second strip portion 20212 are formed by a one-time film forming and patterning process. In other words, the first strip portion 20211 and the second strip portion 20112 are a whole body, and film structures of the two are same.

Figure 4:
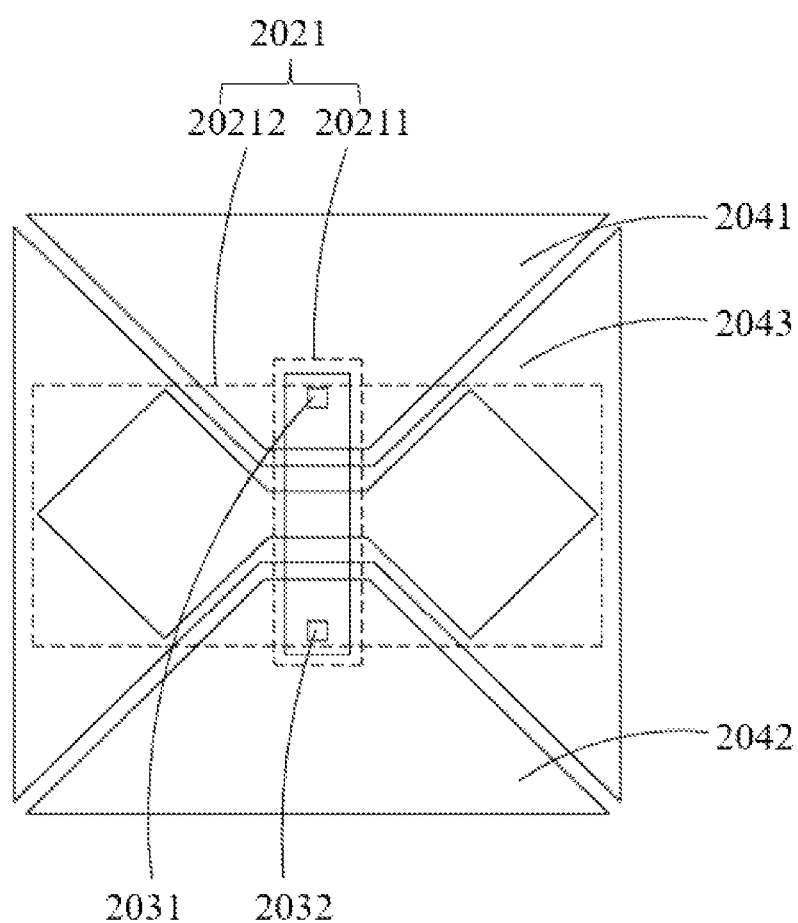
FIG. 4 is another schematic diagram of a structure of a fingerprint identification unit in a fingerprint identification layer of the display module provided by an embodiment of the present invention.

Or, the first strip portion 20211 and the second strip portion 20212 are formed by a two-time film forming and patterning process, which forms the structure shown in FIG. 4. The first strip portion 20211 and the second strip portion 20212 are regarded as two layers. The first strip portion 20111 is above the second strip portion 20112, or the first strip portion 20111 is below the second strip portion 20112. Moreover, the two can be designed as different film structures and materials according to requirements. Generally, material of the first strip portion 20211 is selected from opaque metal conductive materials such as titanium aluminum alloy, and material of the second strip portion 20212 is selected from transparent conductive materials such as indium-tin-oxide or a combination of indium-tin-oxide and silver.

Among the two solutions provided above, the former has simple manufacturing process and is cost-saving, and the latter can design the first strip portion 20211 and the second strip portion 20212 as different layer structures according to process requirements, which makes relevant functions of the fingerprint identification layer better.

Figure 5:
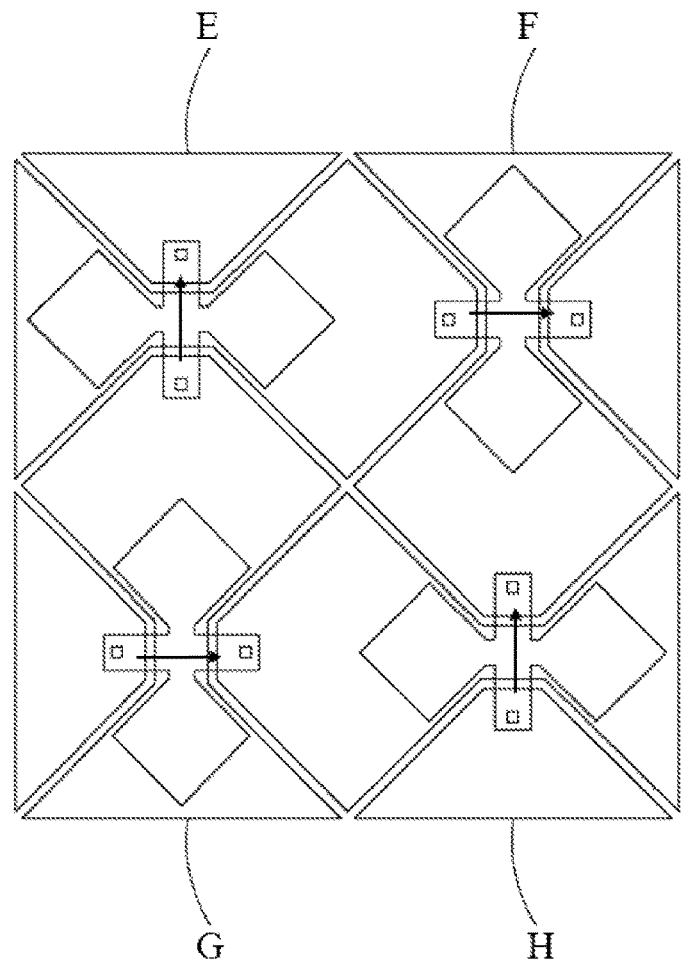
FIG. 5 is another schematic diagram of an arrangement of the fingerprint identification units in the fingerprint identification layer of the display module provided by an embodiment of the present invention.

In some embodiments, in the fingerprint identification layer, four fingerprint identification units arranged in two rows by two columns constitute a smallest repeating unit. Please refer to FIG. 5 for its structure. In two fingerprint identification units of a pair of opposite corners, such as the fingerprint identification unit E and the fingerprint identification unit H, conduction directions of the first driving electrode and the second driving electrode are both a first direction. In two fingerprint identification units of another pair of opposite corners, such as the fingerprint identification unit F and the fingerprint identification unit G, conduction directions of the first driving electrode and the second driving electrode are both a second direction. The first direction and the second direction are perpendicular to each other. Through the above structural design, in the smallest repeating unit composed of four fingerprint identification units, there is only one group of bridge points in each row and each column, and a driving resistance and the sensing resistance can maintain a same level to prevent all the bridge points from being concentrated on TX or RX, causing impedance to exceed a standard. In this arrangement, one driving electrode of one of the fingerprint identification units is electrically connected to one sensing electrode of the other.

Figure 6:
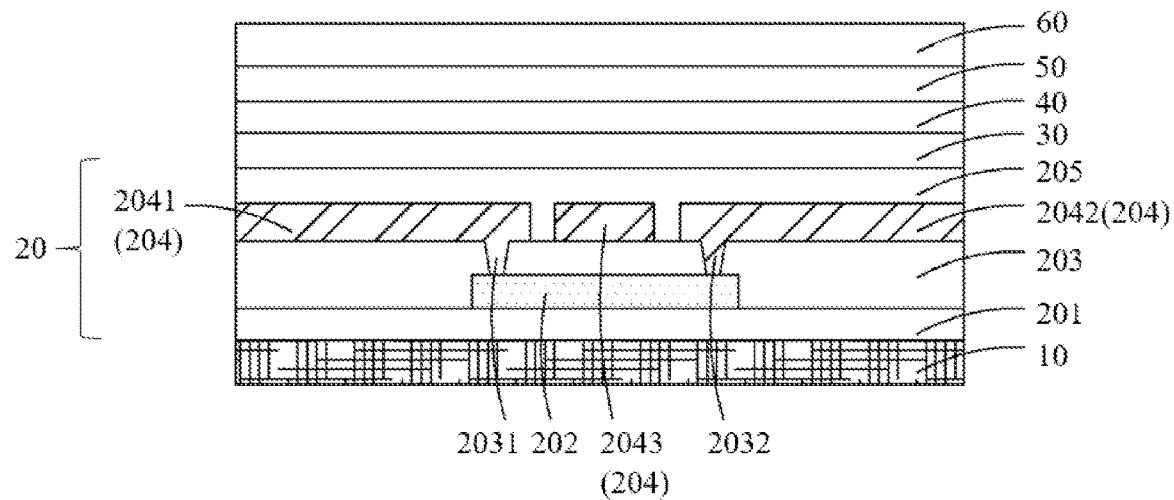
FIG. 6 is another schematic diagram of a cross-sectional structure of a display module provided by an embodiment of the present invention.

In some embodiments, a cross-sectional structure of the display module is shown in FIG. 6, and a first adhesive layer 30, a polarizer 40, a second adhesive layer 50, and a cover plate 60 are further provided on the fingerprint identification layer 20.

Another embodiment of the present invention also provides a display device. The display device includes the foregoing display panels, and the display device includes, but is not limited to, mobile phones, tablet computers, computers, televisions, on-board displays, smartwatches, and VR devices, which are not specifically limited by the present invention.

It should be explained that the foregoing structures are only described in the embodiments of the foregoing display module, and understandably, besides the foregoing structure, the display module provided by the embodiments of the present invention can also include any other necessary structures as required, which is not specifically limited herein.

In the above embodiments, the descriptions of the various embodiments are different in emphases, for contents not described in detail, please refer to related description of other embodiments.

The display module and display device provided by embodiments of the present invention is described in detail above, and the description of embodiments above is only for helping to understand technical solutions of the present invention and its core idea. Understandably, for a person of ordinary skill in the art can make various modifications of the technical solutions of the embodiments of the present invention above. However, it does not depart from the scope of the technical solutions of the embodiments of the present invention.

What is claimed is:

1. A display module, comprising:
a display panel; and
a fingerprint identification layer disposed on the display panel and comprising a first insulating layer, a first conductive layer, a second insulating layer, a second conductive layer, and a third insulating layer, which are sequentially stacked;
wherein the fingerprint identification layer is divided into a plurality of fingerprint identification units arranged in an array and connected to each other;
wherein in any one of the fingerprint identification units, the first conductive layer comprises a multifunctional electrode, and the second conductive layer comprises a first driving electrode, a sensing electrode, and a second driving electrode, which are spaced apart from each other;

wherein in two adjacent fingerprint identification units, the multifunctional electrodes of the two fingerprint identification units are spaced apart, the sensing electrode of one of the fingerprint identification units is electrically connected to the sensing electrode of the other, or the first driving electrode of one of the fingerprint identification units is electrically connected to the second driving electrode of the other, or the first driving electrode or the second driving electrode of one of the fingerprint identification units is electrically connected to the sensing electrode of the other; and wherein, in one of the two adjacent fingerprint identification units, the first driving electrode and the second driving electrode are both electrically connected to the multifunctional electrode to realize conduction, the sensing electrode is insulated from the multifunctional electrode, and an orthographic projection of the sensing electrode on the display panel and an orthographic projection of the multifunctional electrode on the display panel have an overlapping region;

wherein, in the other of the two adjacent fingerprint identification units, a first sensing electrode and a second sensing electrode are both electrically connected to the multifunctional electrode to realize conduction, the first driving electrode and the second driving electrode are insulated from the multifunctional electrode, and an orthographic projection of the first driving electrode and the second driving on the display panel and an orthographic projection of the multifunctional electrode on the display panel have an overlapping region;

wherein an area of the overlapping region of the orthographic projection of the sensing electrode on the display panel and the orthographic projection of the multifunctional electrode on the display panel accounts for 10 to 50% of an area of the sensing electrode, wherein an area of the overlapping region of the orthographic projection of the driving electrodes on the display panel and the orthographic projection of the multifunctional electrode on the display panel accounts for 10 to 50% of an area of the driving electrodes, wherein in the fingerprint identification layer, four fingerprint identification units, of the plurality of fingerprint identification units, are arranged in two rows by two columns constitute a smallest repeating unit, wherein two fingerprint identification units that are arranged on opposite corners of the smallest repeating unit have the multifunctional electrode arranged in the same direction, wherein two fingerprint identification units that are arranged in the same row or the same column of the smallest repeating unit have the multifunctional electrode arranged perpendicular to each other.

2. The display module according to claim 1, wherein the second insulating layer is provided with a first through hole and a second through hole, and the first driving electrode and the second driving electrode are electrically connected to the multifunctional electrode through the first through hole and the second through hole, respectively.

3. The display module according to claim 1, wherein materials of the first conductive layer and the second conductive layer are independently selected from one or more of gold, silver, copper, lithium, sodium, potassium, magnesium, aluminum, zinc, indium-tin-oxide, aluminum-doped zinc-oxide, antimony-doped tin-oxide, carbon nanotubes, and nano silver.

4. The display module according to claim 3, wherein the first conductive layer and the second conductive layer are stacked layers of indium-tin-oxide/silver/indium-tin-oxide layers.

5. The display module according to claim 4, wherein a thickness of the indium-tin-oxide layer ranges from 5 to 50 nanometers, and a thickness of the silver layer ranges from 5 to 30 nanometers.

6. The display module according to claim 1, wherein materials of the first insulating layer, the second insulating layer, and the third insulating layer are independently organic insulating materials or inorganic insulating materials.

7. The display module according to claim 1, wherein in a top view, the sensing electrode is an hourglass shape, and the first driving electrode and the second driving electrode are respectively disposed in recessed portions on two sides of the hourglass shape.

8. The display module according to claim 1, wherein shapes of the first driving electrode and the second driving electrode are isosceles trapezoidal or triangular.

9. The display module according to claim 1, wherein the multifunctional electrode, electrically connecting the first driving electrode and the second driving electrode together, comprises a first strip portion and a second strip portion arranged crosswise, the first driving electrode and the second driving electrode are both electrically connected to the first strip portion, and an orthographic projection of the second strip portion on the display panel is located in the orthographic projection of the sensing electrode on the display panel.

10. The display module according to claim 9, wherein the first strip portion and the second strip portion are formed by a one-time film forming and patterning process.

11. The display module according to claim 9, wherein the first strip portion and the second strip portion are formed by a two-time film forming and patterning process.

12. The display module according to claim 11, wherein the first strip portion is formed above the second strip portion, or the first strip portion is formed under the second strip portion.

13. The display module according to claim 11, wherein material of the first strip portion is selected from opaque metal conductive materials, and material of the second strip portion is selected from transparent conductive materials.

14. The display module according to claim 13, wherein the material of the first strip portion is titanium aluminum alloy, and the material of the second strip portion is indium-tin-oxide or a combination of indium-tin-oxide and silver.

15. The display module according to claim 1, wherein
in two fingerprint identification units of a pair of opposite corners, conduction directions of the first driving electrode and the second driving electrode are both a first direction; and
in two fingerprint identification units of another pair of opposite corners, conduction directions of the first driving electrode and the second driving electrode are both a second direction, and the first direction and the second direction are perpendicular to each other.

16. The display module according to claim 1, wherein a first adhesive layer, a polarizer, a second adhesive layer, and a cover plate are further provided on the fingerprint identification layer.

17. A display device, comprising the display module according to claim 1.

18. The display module according to claim 1, wherein the multifunctional electrode, electrically connecting the first sensing electrode and the second sensing electrode together, comprises a first strip portion and a second strip portion arranged crosswise, the first sensing electrode and the second sensing electrode are both electrically connected to the first strip portion, and an orthographic projection of the second strip portion on the display panel is located in the orthographic projection of the driving electrode on the display panel.

19. The display module according to claim 18, wherein the first strip portion and the second strip portion are formed by a one-time film forming and patterning process.

20. The display module according to claim 18, wherein the first strip portion and the second strip portion are formed by a two-time film forming and patterning process.

\* \* \* \* \*